US006271513B1

(12) United States Patent
Wei et al.

(10) Patent No.: US 6,271,513 B1
(45) Date of Patent: Aug. 7, 2001

(54) LARGE AREA SCANNING TIP SYSTEM FOR NEAR FIELD MICROSCOPE

(75) Inventors: Pei-Kuan Wei; Wunshain Fann, both of Taipei (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/222,047

(22) Filed: Dec. 29, 1998

(30) Foreign Application Priority Data

Sep. 9, 1998 (TW) ................................................ 87115023

(51) Int. Cl.[7] ........................................................ H01J 3/14
(52) U.S. Cl. ........................................ 250/234; 250/559.29
(58) Field of Search ................................ 250/201.3, 234, 250/235, 306, 216, 559.29; 73/105; 356/356

(56) References Cited

U.S. PATENT DOCUMENTS 5,838,000 * 11/1998 Mertesdorf et al. .................. 250/234

OTHER PUBLICATIONS

C. Wei, et al. "Direct Measurements of the True Vibrational Amplitudes in Shear Force Microscopy." *Applied Physics Letter* 67. p. 3836. 1995.
P. Wei, et al. "Tip–Sample Distance Regulation for Near–Field Scanning Optical Microscopy Using the Bending Angle of the Tapered Fiber Probe." *Journal of Applied Physics*. vol. 84, No. 9. p. 4655. Nov., 1998.
P. Wei, et al. "Large Scanning Area Near Field Optical Microscopy." *Review of Scientific Instruments.* vol. 69, No. 10. p. 3614. Oct., 1998.

Eric Betzig and Jay K. Trautman; "Near–Field Optics: Microscopy, Spectroscopy, and Surface Modification Beyond the Diffraction Limit;" Science; vol. 257; pp. 189–195; Jul. 10, 1992.

(List continued on next page.)

*Primary Examiner*—Que T. Le
*Assistant Examiner*—Thanh X. Luu
(74) *Attorney, Agent, or Firm*—Knobbe, Martens, Olson & Bear, LLP

(57) ABSTRACT

A shear force feedback system, a large area scanning tip near field optical microscope using said system, and a scanning method of said microscope are provided. The shear force feedback system uses a probe to scan a large area of a sample's surface. This system constitutes a large area near field scanning optical microscope. The shear force feedback system comprises a laser for providing a laser beam; a cylinder lens for converting the laser beam from the laser into a uniformly-distributed beam over a large area along a plane parallel to the sample; a probe, disposed on a vibration apparatus and able to vibrate on the plane parallel to the sample, wherein a tip of the probe is placed in the uniformly-distributed beam; a moving apparatus for moving the probe along the plane parallel to the sample so as to scan the sample; and a detecting apparatus for detecting the variation of the light intensity distribution due to the variation of vibration angle around the probe, so as to use feedback to control the distance between the probe and the surface of the sample according to the variation of the light intensity. The probe can scan any kind of sample, including large surface area samples. The near field optical microscope provides a wide dynamic scanning range, from sub-micron to millimeter.

17 Claims, 5 Drawing Sheets

OTHER PUBLICATIONS

E. Betzig, et al.; "Combined Shear Force and Near–Field Scanning Optical Microscopy;" Appl. Phys. Lett. 60 (20); pp. 2484–2486; May 18, 1992.

Fred F. Froehlich and Tom D. Milster; "Minimum Detectable Displacement in Near–Field Scanning Optical Microscopy;" Appl. Phys. Lett. 65 (18), pp. 2254–2256; Oct. 31, 1994.

Khaled Karraj and Robert D. Grober; "Piezoelectric tip–sample distance control for near field optical microscopes;" Appl. Phys. Lett., vol. 66, No. 14, pp. 1842–1844; Apr. 3, 1995.

J.W.P. Hsu, et al.; "A nonoptical tip–sample distance control method for near–field scanning optical microscopy using impedance changes in an electromechanical system;" Rev. Sci. Instrum; vol. 66, No. 5; pp. 3179–3181; May, 1995.

M.N. Armenise; "Fabrication Techniques of Lithium Niobate Waveguides;" Lee Proceedings, vol. 135, Pt. J, No. 2; pp. 85–91; Apr., 1988.

Chih–Chun Wei, et al.; "Direct Measurements of the True Vibrational Amplitudes in Shear Force Microscopy;" Appl. Phys. Lett. 67 (26); pp. 3835–3837; Dec. 25, 1995.

Y.T. Yang, et al.; "Vibration Dynamics of Tapered Optical Fiber Probes;" J. Appl. Phys. 81 (4); pp. 1623–1627; Feb. 15, 1997.

* cited by examiner

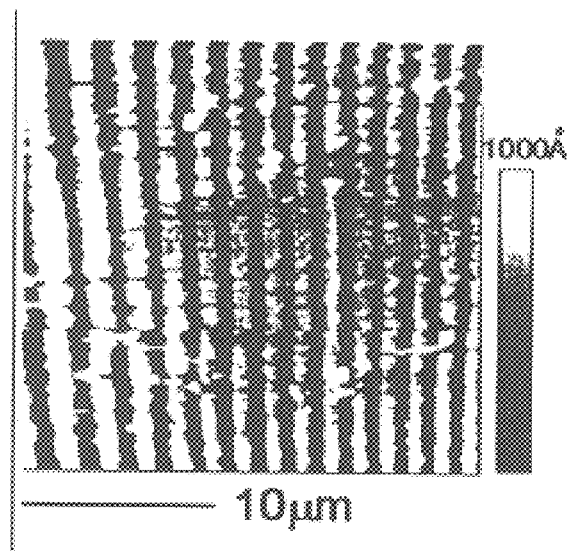
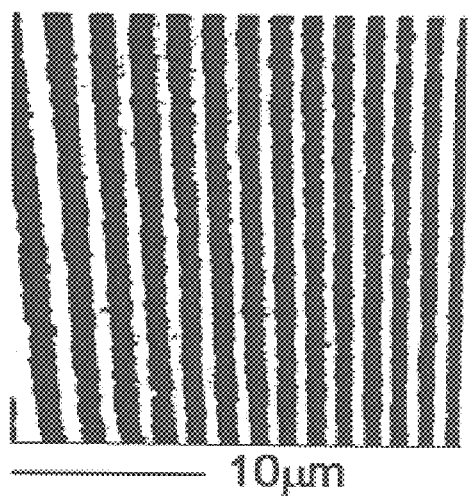
FIG. 8a  FIG. 8b
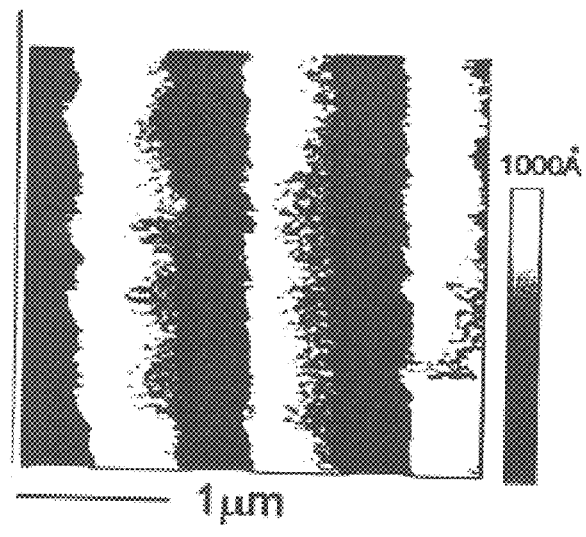
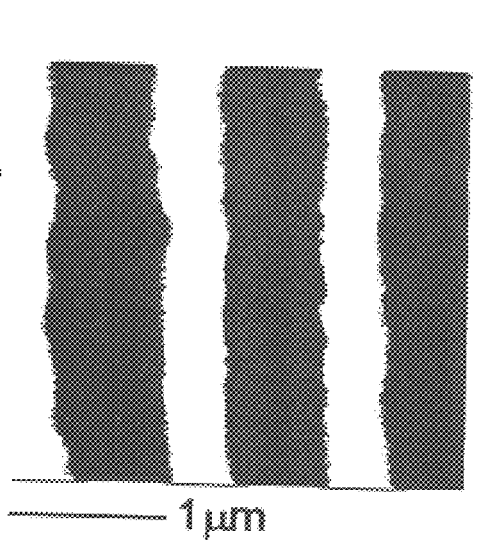
FIG. 9a  FIG. 9b

LARGE AREA SCANNING TIP SYSTEM FOR NEAR FIELD MICROSCOPE

BACKGROUND OF THE INVENTION

1. Field of the Invention

The present invention relates to an optical microscope. In particular, it relates to a shear force feedback system, a large area scanning-tip near field optical microscope using said system, and a scanning method for said microscope.

2. Description of Prior Art

The art of the near field optical microscopy transcends the restrictions of optical diffraction. It allows the observation of optical properties as small as several hundred angstroms on the surface of the sample, permitting its use in the fields of the sub-micron technology and the biology. However, while using this method, it is necessary to maintain a distance between the probe and the surface of the sample of less than several hundred angstroms. Thus, near-field optical microscopy requires a feedback control to keep this distance. At present, the feedback control mechanism is either optical or non-optical. In prior arts, there are many mechanisms using optical techniques such as "Near-Field Optics: Microscopy, Spectroscopy, and Surface Modification Beyond the Diffraction Limit," written by E. Betzig and J. K. Trautman, Science 257, 189(1992), and "Combined shear force and near-field scanning optical microscopy," disclosed by E. Betzig, P. L. Finn and J. S. Weiner, Appl. Phys. Lett. 60, 2484 (1992), and "Minimum detectable displacement in near-field scanning optical microscopy," of F. F Froehlich and T. D. Milster, Appl. Phys. Lett. 65, 2254(1994). There are also many mechanisms using non-optical technique such as "Piezoelectric tip-sample distance control for near field optical microscopes," disclosed by K. Karrai and R. D. Grober, Appl. Phys. Lett. 66, 1842(1995), and "A non-optical tip-sample distance control method for near-field scanning optical microscopy using impedance changes in an electromechanical system," disclosed by J. W. P. Hsu, M. Lee and B. S. Deaver, Rev. Sci. Instrum. 66, 3177 (1995). Optical methods have the benefit of simple and stable utility and are widely used by researchers.

FIG. 1 shows a prior art of a near-field optical microscope using an optical mechanism, which is described below:

At first, a piezoelectric material 10 actuates a fiber probe 12 to vibrate in a direction parallel to the surface (i.e., x direction).

Then the light beam is focused on the tapered region of the tip end of the fiber probe by the lens 14, a part of the light beam reflected by the tip end being focused by the lens 16.

The light focused by the lens 16 is then detected by the photo-detector 18. The intensity of the light brings the information regarding to the vibration amplitude of the tip position.

The phase-locked amplifier is used to measure the small signal of the amplitudes or the phases of the vibration. Finally, the varieties of the amplitudes or the phases serve as the feedback signal of the distance between the fiber probe and the surface of the sample.

The optical method given above has been disclosed in "Direct measurements of the true vibrational amplitudes in shear force microscopy," C. C. Wei, P. K. Wei and W. S. Fann, Appl. Phys. Lett. 67, 3835 (1995).

FIG. 2 shows a part of the light beam being reflected and passing through the lens 24 to the photo-detector 26 while a light beam is focused on the tip of the probe 22 in the transversal direction (x direction). The light beam ($P_{dc}(x)$) reflected to the photo-detector 26 changes in intensity as the probe 22 moves. The relationship between the variation ($P_{ac}(x)$) and the small displacement($\Delta x$) is given below:

$$P_{ac}(x)=|P_{dc}(x+\Delta x)-P_{dc}(x)|\approx|P'_{dc}(x)|\Delta x \qquad (1)$$

The distribution of a conventional laser light focus beam is a Gaussian distribution, i.e., exp $$\exp\left(\frac{-x^2}{d^2}\right),$$

so $$P_{ac}(x) = \frac{|2x|}{d^2}\Delta x\, P_{dc}(x) \qquad (2)$$

The measurement of the amplitude ($P_{ac}(x)$) has a maximum value at the position $$x = \frac{d}{\sqrt{2}},$$

so $$\text{Max}(P_{ac}) = \frac{\sqrt{2}\,\Delta x}{d}P_{ac}\!\left(x = \frac{d}{\sqrt{2}}\right) \qquad (3)$$

This value is inversely proportional to the size of the focus spot and the position of the maximum value is at $$x = \frac{d}{\sqrt{2}},$$

so a preferred amplitude signal can be obtained if the size of the focus spot is small.

The optical feedback control method is necessary to put the fiber probe near the focus spot of the light beam, and the size of the focus spot should be as small as possible to obtain a higher value signal. This system provides only a small moving range for the probe on the parallel plane (x-y plane) when the probe scans the surface of the sample. Thus, in a conventional near-field optical microscope, the probe is not moved while scanning the sample's surface. Instead, a piezoelectric crystal is used to move the scanning sample along the parallel plane of the surface. This system is so called the scanning sample system.

However, when the sample needs to be fixed or is too heavy or big, it is impossible to use the sample in this system since the piezoelectric crystal can not move it. In this situation, it is necessary to use a scanning tip system in which the system moves along the x-y plane while controlling the distance between the fiber probe and the surface of the sample.

SUMMARY OF THE INVENTION

Thus the object of the present invention is to provide a large area scanning tip system, and a near field microscope using the system and a scanning method of the microscope.

An aspect of the present invention is that there is a wide dynamic scanning area for the fiber probe moving along the parallel surface. The structure of the present invention can be used in a scanning tip system for both fixed and unfixed samples.

Additionally, since the fiber probe is very light and the piezoelectric crystal need only move the fiber probe while the probe is scanning the sample (as opposed to moving the sample itself), the system of the present invention can improve the scanning speed.

In the present invention, it is not necessary to collimate the incident light beam and fiber probe in the parallel position because the light beam is uniformly distributed in the large area of the parallel plane. Thus, it is easy to use and requires fewer components.

BRIEF DESCRIPTION OF THE DRAWINGS

The following detailed description, given by way of example and not intended to limit the invention solely to the embodiments described herein, will best be understood in conjunction with the accompanying drawings in which:

FIG. 8a shows the surface image of an optical grating with a scanning area of 26 $\mu$m×26 $\mu$m obtained by an application of the present invention;

FIG. 8b is the diagram of the surface image obtained from the near-field optical microscope in FIG. 8a;

FIG. 9a shows the use of the present invention to measure an optical grating with a scanning area of 3 $\mu$m×3 $\mu$m; and FIG. 9b is the diagram of the near-field optical microscope of FIG. 8a.

DETAILED DESCRIPTION OF THE PREFERRED EMBODIMENTS

The technical aspects and the basic theory of the present invention are herein described. The principal technical aspects of this invention are: (1) the vibration angles near the tip of the fiber probe serve as a feedback signal indicating the distance between the tip of the fiber probe and the sample; (2) instead of a conventional focus lens, a cylinder lens is used in the system of the present invention to provide a wide beam of light uniformly distributed along the longitudinal direction, so that the measurement of the vibration angel for the fiber probe is not affected when the fiber probe moves across a large area of the parallel surface.

Figure 1:
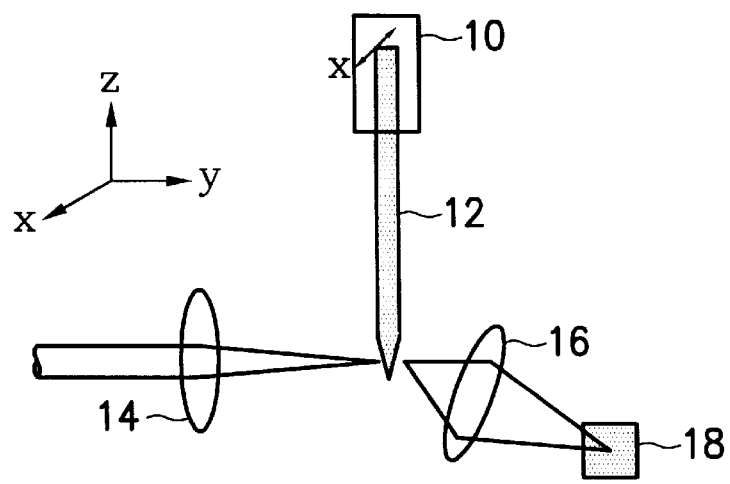
FIG. 1 is the schematic diagram of the conventional optical distance feedback control used in a system of the near field optical microscopy.
Figure 2:
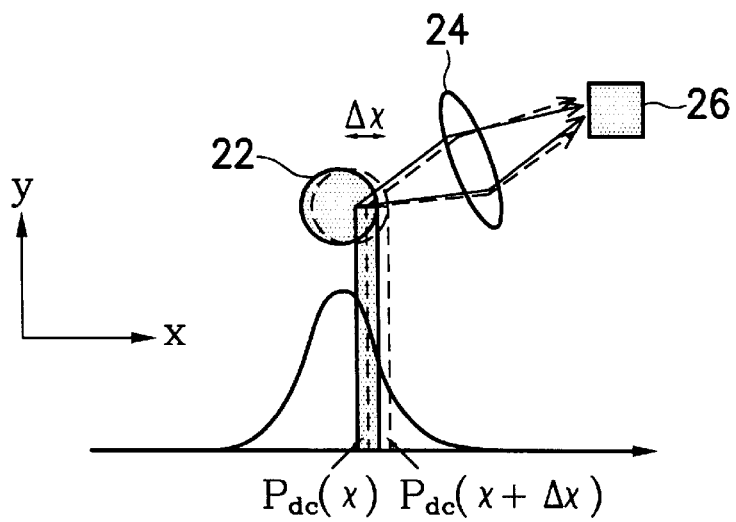
FIG. 2 shows the relationship between the small displacement of the fiber probe and the light intensity of the reflection on the photo-detector.
Figure 3:
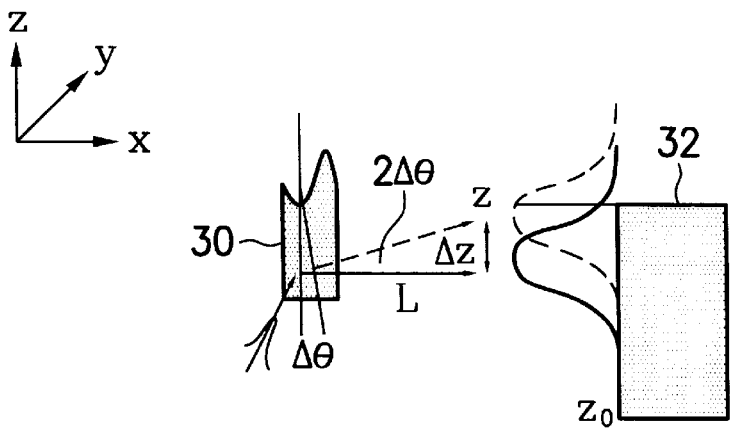
FIG. 3 shows the relationship between the vibration angles of the fiber probe and the distribution of the light intensity on the photo-detector.

The two technical aspects of the present invention are described in detail below:

First, putting the tip of the fiber probe 30 in a light field which is focused along the depth direction of the cylinder lens(z-direction), a small part of the light is reflected to the photodetector 32 ($P_{dc}(z)$) as shown in FIG. 3. As described in "Vibration dynamics of tapered optical fiber probes," Y. T. Yang et al., Appl. Phys., 4, 1623 (1997), there is a small vibration angle ($\Delta\theta$) near the tip of the fiber probe. The vibration angle provides a small variation $\Delta z$ of the reflected light in the z direction. The equation is shown below:

$$P_{dc}(z) = \int_{z_0}^{z} I_z(z)dz \quad (4)$$

$$P_{ac}(z) = P_{dc}(z + \Delta z) - P_{dc}(z) \approx P'_{dc}(z)\ \Delta z = [I_z(z) - I_z(z + \Delta z)]\Delta z \quad (5)$$

in which $P_{dc}$ is the value of the direct current; $P_{ac}$ is the value of the alternating current on the photo-detector; and $I_z(z)$ is the distribution of intensity of the light field in the z direction, which is represented by a Gaussian distribution, $\exp(-z^2/d^2)$, where d is the range of the distribution. In a conventional optical measuring method, the small vibration angle of the fiber probe can not be measured since the light field along the z direction is within the photo-detector, i.e., $z=\infty$, $z_0=-\infty$, $P_{ac}(z)=0$. If a part of the light field is out of the photo-detector ($z\neq\infty$, $z_0=-\infty$), then $$P_{ac}(z)=I_z(Z)\Delta Z \quad (6)$$

Figure 4:
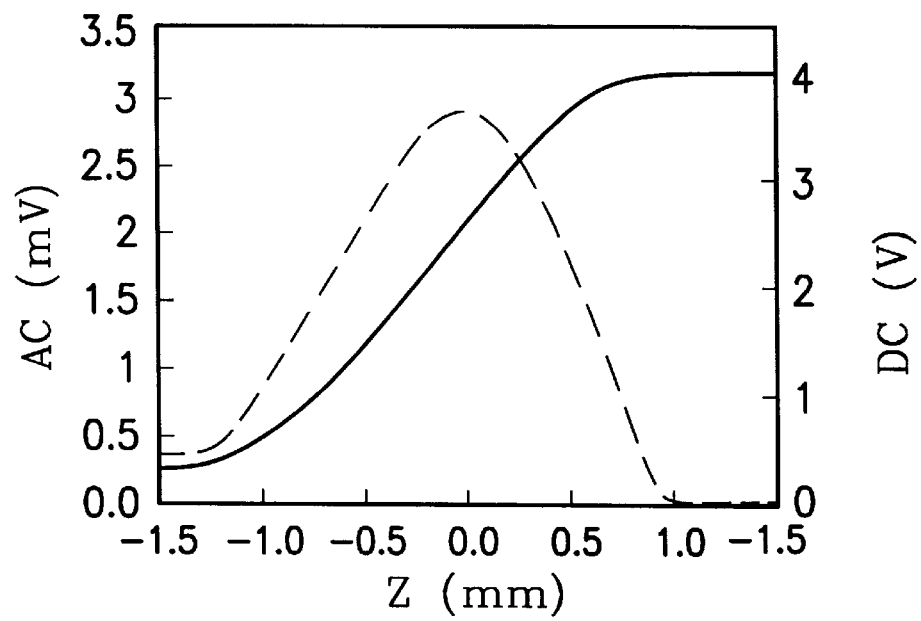
FIG. 4 shows the relationship between the alternating current and the position of the photo-detector, the alternating current being measured from the small vibration of the fiber probe.

Thus, the small vibration angle of the fiber probe can be detected by the photo-detector. Please refer to the FIG. 4, which illustrates the measured value of the alternating current, as well as the relationship between the value of the alternating current and the position of the photo-detector. The maximum value of the alternating current appears at the position z=0, e.g., half of light beam is out of the photo-detector.

Please refer to the FIG. 3, in which $\Delta z=2L\Delta\theta$ and L is the distance between the fiber probe 30 and the photo-detector 32. The vibration angle can be measured from the maximum value of the alternating current and the direct current on the photo-detector 32, the size of laser spot, and the distance between the fiber probe 30 and the photo-detector 32.

$$\Delta\theta = \frac{d}{L} \frac{\sqrt{\pi}}{4} \frac{P_{ac}(z=0)}{P_{dc}(z=0)} \quad (7)$$

Figure 5:
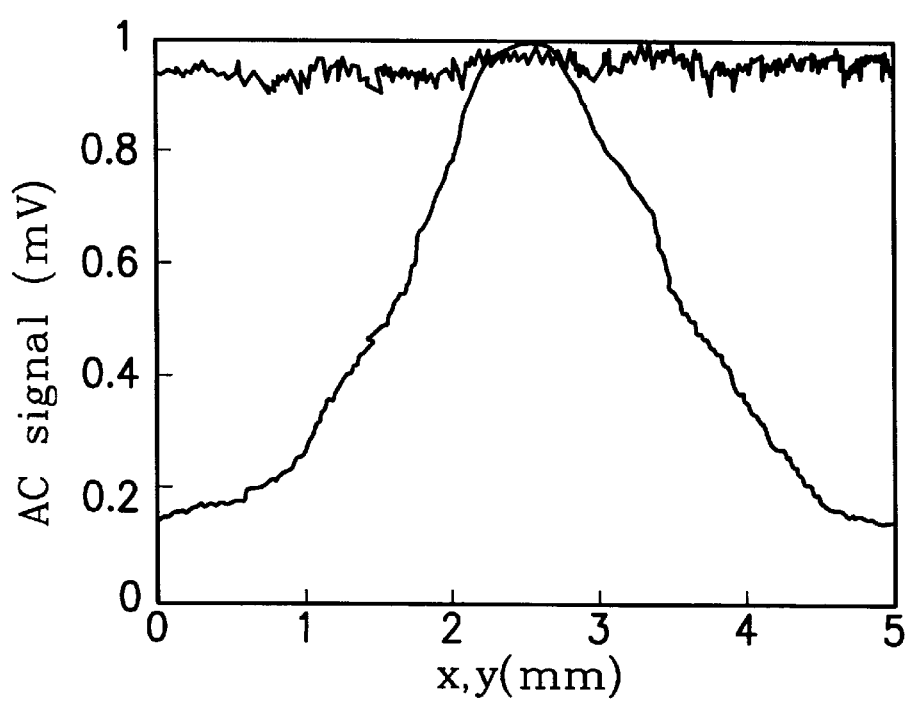
FIG. 5 is a diagram of the variation of the alternating current measured from the vibration angles in different x,y position.

Second, when a laser beam passes through a cylinder lens, the laser beam is not focused in the transversal direction (x-direction), but focused in the depth direction (z-direction). It does not have a large variation around the focus spot in its propagation direction (y-direction); therefore, the laser beam has a uniform distribution along the depth direction of the cylinder lens at the focus spot thereof. The measured vibration angle results in the position variation of the laser beam along the z-direction of the photodetector. On the x-y plane of the cylinder lens, the laser beam is uniformly distributed in a large area along the z-direction. Therefore the measurement of the vibration angle is independent of the position on the x-y plane and the probe can be used to scan a large area. Refer to FIG. 5, which illustrates the variation of alternating current signals for the vibration angles at different positions. The alternating current signal does not substantially change in the y-direction, so the probe can arbitrarily move along the y-direction within the range of the light distribution. In contrast, the measurement is affected in the x-direction due to the distribution of the incident laser beam (the radius of the laser beam is 2 mm), which restricts the scanning area of the probe. However, the probe still can move within a range of about 1 mm.

Figure 6A:
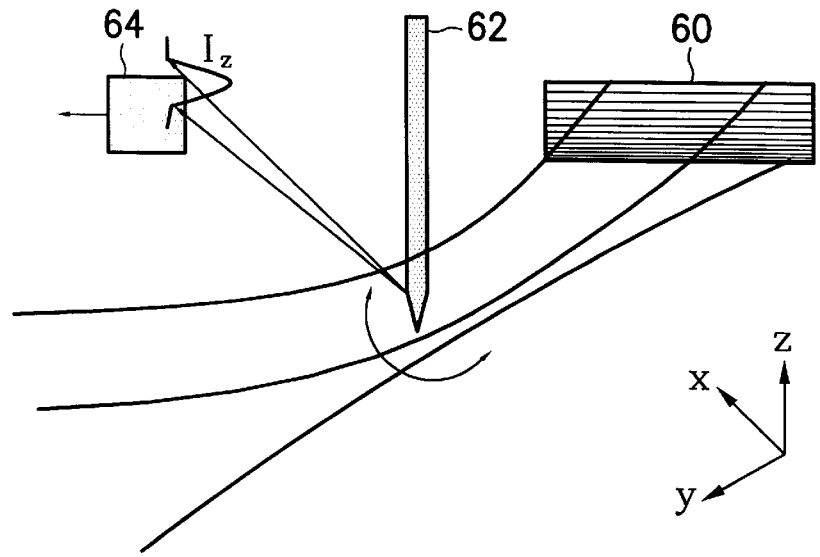
FIG. 6a shows the basic performance of the near field optical microscope for one embodiment of the present invention.
Figure 6B:
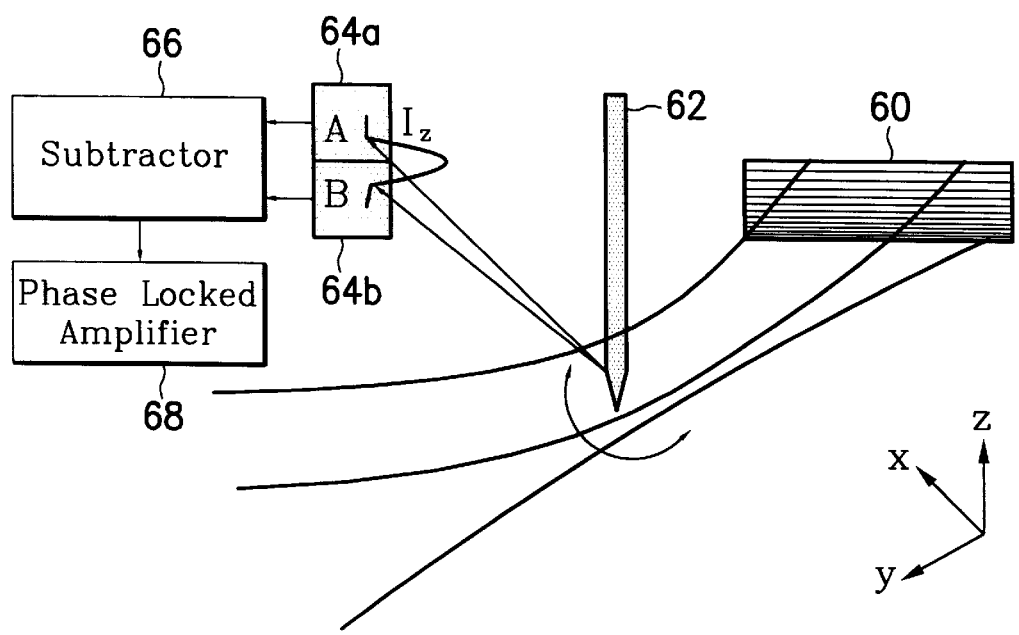
FIG. 6b shows the basic performance of the near field optical microscope for another embodiment of the present invention.

Referring to FIG. 6a, the structure the present invention mainly includes the following two parts: (1) a cylinder lens 60 used to provide a uniformly-distributed light beam in a large area, so that the photodetector 64 can measure the vibration angle around the tip of the fiber probe while the probe 62 moves across a large area of the parallel plane (xy plane); (2) a photodetector 64 and a phase-locked amplifier used to measure the vibration angle around the tip of the fiber probe, in which half of the laser beam is out of the photo-detector 64 while measuring the angle. In a system as shown in FIG. 6a, about half of the laser beam enters the photodetector to provide the maximum value of the alternating current, but the other half is wasted. The present invention provides another photo-detecting method. Refer to FIG. 6b, which shows the structure of the system. According to this method, two photodetectors 64a, 64b (up and down) are used to respectively receive one half of the laser beam. If the value of the alternating current detected by the detector A 64a is positive, then the value of the alternating current detected on the detector B 64b is negative. The two signals generated by the detectors A and B are then subtracted by the subtractor 66. The subtracted result is sent to the phase-locked amplifier 68; thus, the value of the alternating current is twice than that in FIG. 6a.

Figure 7:
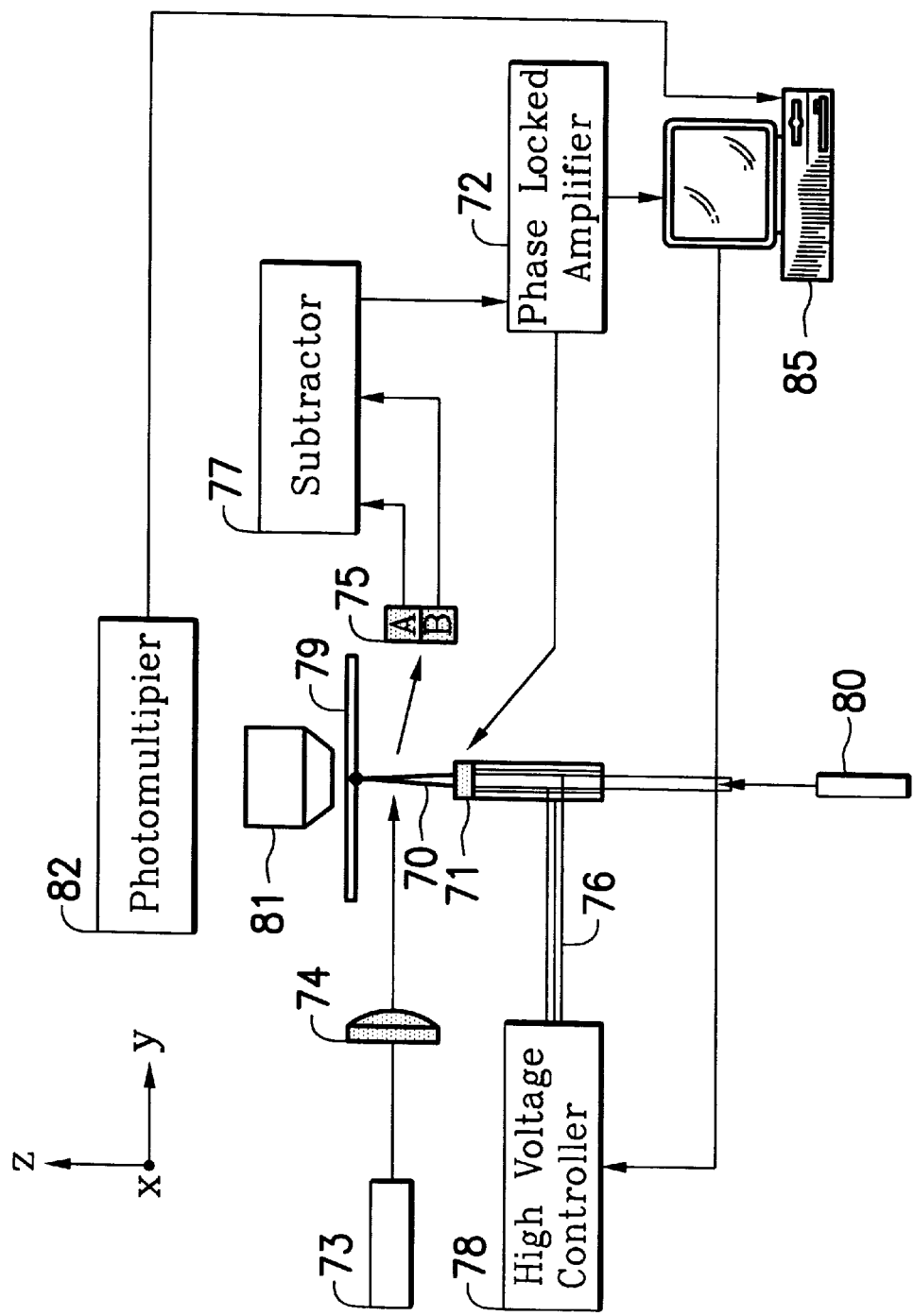
FIG. 7 shows the real application of the near-field optical microscope of the present invention.

Referring to FIG. 7, an application of the present invention for near field optical microscopy includes the following steps. First, a fiber probe 70 is fixed on a piece of piezo-electric material 71. Then a small AC voltage signal (1~10 mV, 10~100 kHz) provided by the phase-locked amplifier 72 is inputted to the piezoelectric material 71, so that the fiber probe 70 is vibrated in the transversal direction due to the resonance. Then a laser beam produced by infrared laser (or a visible laser) is directed to the cylinder lens 74 to uniformly distribute the light beam over a large area. The tip of the fiber probe vibrates on the plane parallel to the sample. The position of the photodetector 75 is adjusted to input one half of the light into the detector A and the other half of the light into the detector B. The subtractor 77 is used to subtract the signal generated by the detector B from the signal generated by the detector A to get the zero value of the direct current and the maximum value of the alternating current, thus reading the alternating current value of A-B through the phase-locked amplifier. The piezoelectric material 71, together with the fiber probe 70, is fixed on another piezo-electric crystal 76, which is controlled by a high voltage controller 78, so that the fiber probe 70 scans the x-y plane of the sample. The value of the alternating current in z-direction is thus read by means of the phase-locked amplifier 72 and serves as the feedback for controlling the distance between the fiber probe 70 and the surface of the sample 79. The scanning provides the topography of the surface of the sample 79, which is similar to the image generated by an atom force microscope (AFM). While scanning a near-field optical image, a light beam provided by the laser 80 is coupled into one end of the fiber to produce a light source at the tip of the fiber probe. The object lens 81 and the photomultiplier tube 82 are used to collect the light transmitted through the sample from the point light source, wherein the contrast of the collected light forms the image of the sample for near field optics.

The high voltage controller 78 described above is controlled by the computer 85 to change the scanning position of the fiber probe 70 on the x-y plane through the piezo-electric crystal 76. Further, the photomultiplier tube 82 amplifies the input light to generate electrical signals and transmits the signals to the computer 85 so as to provide a near-field optical image after being processed.

Refer to FIG. 8a and FIG. 8b, which illustrates an application of the system of this invention to measure an optical grating. FIG. 8a is a surface image in the scanning area of 26 $\mu$m×26 $\mu$m, and FIG. 8b shows the corresponding near-field optical microscopy image of the optical grating shown in FIG. 8a. The width of the optical grating is 1 $\mu$m in this embodiment. The scanning area is 26 $\mu$m×26 $\mu$m due to the restriction of the piezoelectric crystal. However, the system of the present invention is not restricted to this area.

FIG. 9a and FIG. 9b illustrate another application for an optical grating by using the system of this invention, wherein FIG. 9a is a surface image in the scanning area of 3 $\mu$m×3 $\mu$m and FIG. 9b shows the corresponding near field optical microscopy image of the optical grating shown in FIG. 9a. The width of the optical grating is 0.5 $\mu$m in this embodiment. From FIGS. 8a, 8b and FIGS. 9a, 9b, it can be seen that the use of this invention provides an excellent measurement capability no matter whether scanning a sample over a small area or a large area.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A shear force feedback system capable of scanning a large area of a sample comprising:

a first laser for providing a laser beam;

a cylinder lens for converting the laser beam from the first laser into a uniformly distributed beam in a large area along a plane parallel to the sample;

a probe, disposed on a vibration apparatus and able to vibrate on the plane parallel to the sample, wherein the probe has a tip and the tip of the probe is placed in the uniformly distributed beam;

a moving apparatus for moving the probe along the plane parallel to the sample so as to scan the sample;

a detecting apparatus for detecting a variation of light intensity distribution due to a variation of the vibration angle around the probe, so as to use feedback to control the distance between the probe and the surface of the sample according to the variation of the light intensity.

2. A shear force feedback system as claimed in claim 1, wherein the first laser is an infrared laser or a visible laser.

3. A shear force feedback system as claimed in claim 1, wherein the vibration apparatus is a piezoelectric material.

4. A shear force feedback system as claimed in claim 1, wherein the moving apparatus is a piezoelectric crystal.

5. A shear force feedback system as claimed in claim 1, wherein the detecting apparatus comprises two detectors.

6. A shear force feedback system as claimed in claim 3, wherein the piezoelectric material receives an alternating current signal, so that the probe vibrates due to resonance.

7. A shear force feedback system as claimed in claim 5, wherein the two detectors respectively receive one half of the light beam and output a signal, and an output of one detector is subtracted from an output of the other detector to obtain a zero value of a direct current and a maximum value of an alternating current, the value of the alternating current being retrieved by a phase-locked amplifier.

8. A near-field optical microscope comprising:

a shear force feedback system as claimed in claim 1;

a second laser for providing a laser beam coupled into one end of the probe and producing a light source at the tip of the probe wherein the light source is adapted to transmit a light through the sample; and an image processing apparatus for collecting the light transmitted through the sample from the light source to form a near-field optical image.

9. A method for scanning a large area of a sample with a near-field optical microscope using a shear force feedback system as claimed in claim 1, comprising the steps of:

(i) inputting a value of alternating current to the vibration apparatus so that the probe vibrates on the plane parallel to the sample;

(ii) passing a first laser beam through the cylinder lens to produce a uniformly distributed beam over a large area;

(iii) placing the tip of the probe on the plane of the uniformly-distributed beam and using the detecting apparatus to detect the variation of light intensity due to the variation of the vibration angle around the tip of the probe so as to output the value of the alternating current, and controlling the distance between the probe and the surface of the sample according to the value of alternating current;

(iv) coupling a second laser beam into the probe and producing a light source at the tip of the probe;

(v) moving the probe by the moving apparatus to scan the plane parallel to the sample;

(vi) collecting the light from the light source passing through the sample with the image processing apparatus to form a near-field optical image of the sample.

10. A scanning method as claimed in claim 9, wherein the first laser is an infrared laser.

11. A scanning method as claimed in claim 9, wherein the vibration apparatus comprises a piezoelectric material.

12. A scanning method as claimed in claim 9, wherein the moving apparatus comprises a piezoelectric crystal.

13. A scanning method as claimed in claim 9, wherein the detecting apparatus comprises two detectors.

14. A scanning method as claimed in claim 11, wherein the piezoelectric material receives an alternating current signal, so that the probe vibrates due to resonance.

15. A scanning method as claimed in claim 13, wherein the two detectors respectively receive one half of the light beam and output a signal, and an output of one detector is subtracted from an output of the other detector to obtain a zero value of a direct current and a maximum value of an alternating current, the maximum value of alternating current being retrieved by a phase-locked amplifier.

16. A sheer force feedback system as claimed in claim 1, wherein the tip of the probe is a fiber tip.

17. A scanning method as claimed in claim 9, wherein the tip of the probe is a fiber tip.

* * * * *